(12) United States Patent
Mawatari et al.

(10) Patent No.: US 7,639,690 B2
(45) Date of Patent: Dec. 29, 2009

(54) NETWORK COMMUNICATION MONITORING SYSTEM, NETWORK COMMUNICATION MONITORING METHOD, CENTRAL APPARATUS, RELAY UNIT, AND MEMORY PRODUCT FOR STORING A COMPUTER PROGRAM

(75) Inventors: Katsunori Mawatari, Fukuoka (JP); Hirofumi Yagawa, Fukuoka (JP); Daisuke Kobayashi, Fukuoka (JP); Kouichi Tsuzaki, Fukuoka (JP); Yukihide Yamasaki, Fukuoka (JP); Manabu Tomiyasu, Fukuoka (JP); Makoto Kawatoko, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 370 days.

(21) Appl. No.: 11/488,786

(22) Filed: Jul. 19, 2006

(65) Prior Publication Data

US 2007/0217422 A1   Sep. 20, 2007

(30) Foreign Application Priority Data

Mar. 20, 2006   (JP)   ............................ 2006-077283

(51) Int. Cl.
*H04L 12/56* (2006.01)
(52) U.S. Cl. ...................................... 370/392; 370/395
(58) Field of Classification Search ................ 370/389, 370/395, 400, 252; 709/224
See application file for complete search history.

(56) References Cited

U.S. PATENT DOCUMENTS

| | | | | |
|---|---|---|---|---|
| 5,452,297 | A * | 9/1995 | Hiller et al. ............ | 370/395.61 |
| 5,854,834 | A * | 12/1998 | Gottlieb et al. ........ | 379/114.04 |
| 6,308,211 | B1 * | 10/2001 | Rosborough et al. ........ | 709/224 |
| 6,343,320 | B1 * | 1/2002 | Fairchild et al. ............ | 709/224 |
| 6,754,622 | B1 * | 6/2004 | Beser et al. ................. | 704/226 |
| 6,873,617 | B1 * | 3/2005 | Karras ........................ | 370/389 |
| 7,000,150 | B1 * | 2/2006 | Zunino et al. ................. | 714/38 |
| 7,111,086 | B1 * | 9/2006 | Ecoleston et al. ............. | 710/33 |
| 7,292,585 | B1 * | 11/2007 | Slaughter et al. ............ | 370/400 |
| 7,315,856 | B2 * | 1/2008 | Iulo et al. ....................... | 707/3 |
| 7,363,242 | B2 * | 4/2008 | Lewis et al. .................... | 705/5 |
| 7,406,691 | B2 * | 7/2008 | Fellenstein et al. .......... | 718/104 |
| 7,433,939 | B2 * | 10/2008 | Knebel et al. ................ | 709/221 |
| 7,516,233 | B2 * | 4/2009 | Wang .......................... | 709/231 |
| 7,565,661 | B2 * | 7/2009 | Sim-Tang .................... | 719/318 |
| 2005/0273673 | A1 * | 12/2005 | Gassoway ..................... | 714/45 |
| 2006/0023638 | A1 * | 2/2006 | Monaco et al. ............. | 370/252 |
| 2006/0064481 | A1 * | 3/2006 | Baron et al. ................. | 709/224 |
| 2006/0230309 | A1 * | 10/2006 | Kromer et al. ................ | 714/11 |
| 2007/0043859 | A1 * | 2/2007 | Ruul ............................ | 709/224 |
| 2007/0233633 | A1 * | 10/2007 | Keith ............................ | 706/60 |

FOREIGN PATENT DOCUMENTS

JP    2002-111665    4/2002

* cited by examiner

*Primary Examiner*—Thong H Vu
(74) *Attorney, Agent, or Firm*—Fujitsu Patent Center

(57) ABSTRACT

The central apparatus obtains the destination information of a plurality of terminal devices, generates one request packet consolidating the obtained plural destination information, and transmits the generated one request packet. The relay unit receives one request packet, generates a plurality of request packets on the basis of the consolidated destination information, and transmits the generated request packet. The relay unit receives reply packets from a plurality of terminal devices, generates one reply packet consolidating the destination information of the transmission origins of the received plural reply packets, and transmits them to the central apparatus. The central apparatus receives the returned one reply packet and determines continuation and blockade of the network connection for each terminal device.

18 Claims, 14 Drawing Sheets

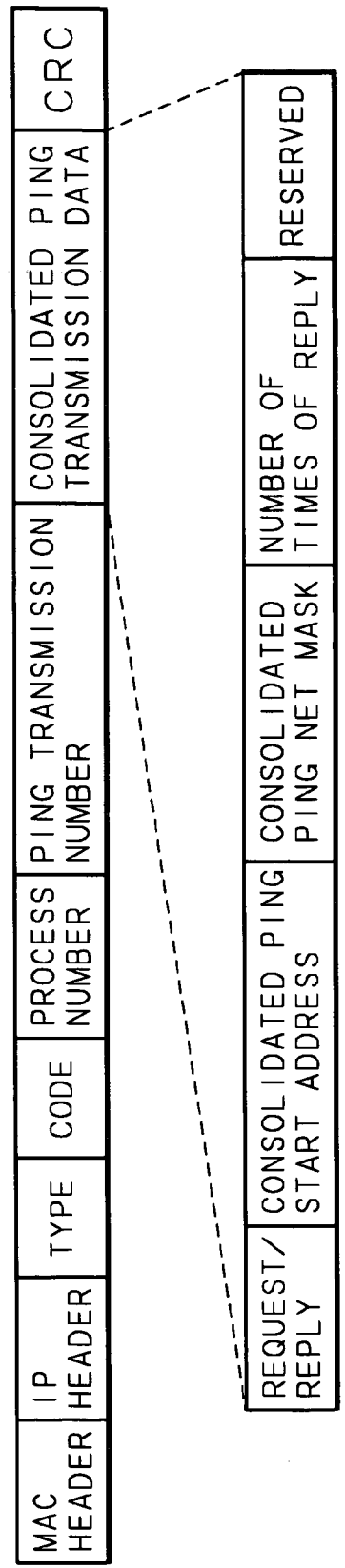
F I G. 6

F I G. 9

REPLY BASE ADDRESS 10. 1. 3. X

| X | 1 | 2 | 3 | 4 | ........ | 253 | 254 | 255 |
|---|---|---|---|---|---|---|---|---|
| REPLY BIT | 1 | 0 | 0 | 0 | ........ | 1 | 1 | 0 |

NETWORK COMMUNICATION MONITORING SYSTEM, NETWORK COMMUNICATION MONITORING METHOD, CENTRAL APPARATUS, RELAY UNIT, AND MEMORY PRODUCT FOR STORING A COMPUTER PROGRAM

CROSS-REFERENCE TO RELATED APPLICATIONS

This Nonprovisional application claims priority under 35 U.S.C.§119(a) on Patent Application No. 2006-077283 filed in Japan on Mar. 20, 2006, the entire contents of which are hereby incorporated by reference.

BACKGROUND OF THE INVENTION

The present invention relates to a network communication monitoring system for monitoring continuation and blockade of a network in the network using an IP network, a network communication monitoring method, a central apparatus, a relay unit, and a memory product for storing a computer program.

In recent years, in accordance with a rapid progress of a communication technology, various services using an IP network has been provided. Then, in order to realize a stable supply of a service, it is required to monitor the state of the IP network. For example, the monitoring apparatus transmits a request packet by a Ping command (a communication monitoring command) to a terminal device to which the monitoring system is connected via the network and the monitoring apparatus can specify the place where a network failure occurs and the terminal device or the like where the failure occurs depending on whether or not it receives a reply packet to the request packet, so that it is possible to attempt an early recovery of the failure (refer to Japanese Patent Application Laid-Open No. 2002-111665).

FIG. 1 is a block diagram showing the structure of a monitoring system of a conventional network. As shown in FIG. 1, a plurality of routers (relay units) 2, 2, . . . is connected to a monitoring apparatus (a central apparatus) 1, and the routers (central apparatuses) 2, 2, . . . are connected thereto in a hierarchical fashion. To the routers 2, 2, . . . at the lowest layer, one or plural terminal devices 3, 3, . . . having the same network classes are connected.

The monitoring apparatus 1 issues a Ping command designating a destination information of the terminal devices 3, 3, . . . which are monitoring objects, for example, an IP address. In the case that the monitoring apparatus 1 issues the Ping command, the monitoring apparatus 1 transmits a request packet to the designated destination and each of the terminal devices 3 receives the request packet. In the case that the terminal device 3 receives the request packet, the terminal device 3 generates a reply packet and returns it to the monitoring apparatus 1. When the monitoring apparatus 1 receives the reply packet, the monitoring apparatus 1 determines that the network with the terminal device 3 which returns this reply packet normally functions and when the monitoring apparatus 1 does not receive the reply packet, the monitoring apparatus 1 determines that a failure occurs in the network with the terminal device 3 which does not return the reply packet.

BRIEF SUMMARY OF THE INVENTION

The present invention has been made taking the foregoing problems into consideration and an object of which is to provide a network communication monitoring system, a network communication monitoring method, a central apparatus, a relay unit, and a memory product for storing a computer program, which can decrease a network load by transmitting a request packet having a new data structure consolidating the destination information for transmitting a request packet when a Ping command is issued and returning a reply packet having a new data structure consolidating the destination information of a transmission origin upon reply in the same way.

In order to attain the above-described object, there is provided a network communication monitoring system according to a first invention, in which a central apparatus and a plurality of terminal devices are connected via a relay unit so as to permit data communication via a plurality of networks; and the central apparatus monitors continuation and blockade of the network connection with respect to the plural terminal devices by transmission and reception of a request packet and a reply packet due to a communication monitoring command; wherein the central apparatus comprises: means for obtaining destination information of the plural terminal devices; means for generating one request packet with obtained plural destination information consolidated; and means for transmitting one generated request packet; and the relay unit comprises: means for receiving the one request packet; means for generating a plurality of request packets on the basis of the consolidated destination information; means for transmitting the generated request packet; means for receiving the reply packet from a plurality of terminal devices; means for generating one reply packet by consolidating the destination information of transmission origins of the received plural reply packets; and a means for returning one generated reply packet to the central apparatus; and the central apparatus further comprises: means for receiving one returned reply packet; and means for determining continuation and blockade of the network connection for each terminal device on the basis of the destination information of the consolidated transmission origin.

In addition, in a network communication monitoring method according to a second invention, a central apparatus and a plurality of terminal devices are connected via a relay unit so as to permit data communication via a plurality of networks; and the central apparatus monitors continuation and blockade of the network connection with respect to the plural terminal devices by transmission and reception of a request packet and a reply packet due to a communication monitoring command; wherein the method comprises the steps of obtaining destination information of the plural terminal devices; generating one request packet with obtained plural destination information consolidated; and transmitting one generated request packet; receiving the one request packet; generating a plurality of request packets on the basis of the consolidated destination information; transmitting the generated request packet to a plurality of terminal devices; receiving a reply packet from a plurality of terminal devices; generating one reply packet by consolidating the destination information of transmission origins of the received plural terminal devices; and returning the generated one reply packet to the central apparatus; receiving the returned one reply packet; and determining continuation and blockade of the network connection for each terminal device on the basis of the destination information of the consolidated transmission origin.

Further, there is provided a central apparatus according to a third invention may include, in which the central apparatus is connected to a plurality of terminal devices via a relay unit so as to permit data communication via a plurality of networks; and the central apparatus monitors continuation and blockade of the network connection with respect to the plural terminal devices by transmission and reception of a request packet and a reply packet due to a communication monitoring command; comprising: means for obtaining destination information of the plural terminal devices; means for generating one request packet with obtained plural destination information consolidated; means for transmitting one generated request packet; a means for receiving one reply packet which is generated by consolidating the destination information of transmission origins of a plurality of reply packets; and means for determining continuation and blockade of the network connection for each terminal device on the basis of the destination information of the consolidated transmission origins.

In addition, there is provided a relay unit according to a fourth invention, in which a central apparatus and a plurality of terminal devices relay communication made via a plurality of networks, comprising: means for receiving one request packet having a plurality of destination information consolidated; means for generating a plurality of request packets on the basis of the consolidated destination information; means for transmitting the generated request packets; a means for receiving a reply packet from a plurality of terminal devices; means for generating one reply packet by consolidating the destination information of the transmission origins of the received plural reply packets; and means for returning the generated one reply packet to the central apparatus.

Further, there is provided a memory product for storing a computer program according to a fifth invention, in which the memory product is executed by a central apparatus, which is connected to a plurality of terminal devices via a relay unit so as to permit data communication via a plurality of networks and monitors continuation and blockade of the network connection with respect to the plural terminal devices by transmission and reception of a request packet and a reply packet due to a communication monitoring command; wherein the computer program causing the central apparatus to function as: means for obtaining destination information of the plural terminal devices; means for generating one request packet with obtained plural destination information consolidated; a means for transmitting one generated request packet; means for receiving one reply packet which is generated by consolidating the destination information of transmission origins of a plurality of reply packets; and means for determining continuation and blockade of the network connection for each terminal device on the basis of the destination information of the consolidated transmission origin.

According to the present invention, a central apparatus and a plurality of terminal devices are connected via a relay unit so as to permit data communication via a plurality of networks; and the central apparatus monitors continuation and blockade of the network connection with respect to the plural terminal devices by transmission and reception of a request packet and a reply packet due to a communication monitoring command. The central apparatus obtains destination information of the plural terminal devices; generates one request packet with obtained plural destination information consolidated; and transmits one generated request packet. The relay unit receives the one request packet; generates a plurality of request packets on the basis of the consolidated destination information; transmits the generated request packet to the plural terminal devices. In addition, the relay unit receives the reply packet responding to the request packet from a plurality of terminal devices; generates one reply packet by consolidating the destination information of transmission origins of the received plural reply packets; and returns one generated reply packet to the central apparatus. The central apparatus receives one returned reply packet; and determines continuation and blockade of the network connection for each terminal device on the basis of the destination information of the consolidated transmission origin. Thereby consolidating the destination information of a terminal device for transmitting a request packet by a communication monitoring command, it is sufficient to transmit not a plurality of request packets but one request packet and it is also sufficient for the reply packet to receive one reply packet where the destination information of a transmission origin are consolidated. Accordingly, even in the case of monitoring the communication of a plurality of terminal devices, the central apparatus does not have to transmit the request packet for each terminal device and it does not have to receive the reply packet to be returned for each terminal device, so that it is possible to decrease a pressure of a network band due to the request packet and the reply packet monitoring continuation and blockade of the network.

According to the present invention, consolidating the destination information of a terminal device for transmitting a request packet by a communication monitoring command, it is sufficient to transmit not a plurality of request packets but one request packet and it is also sufficient for the reply packet to receive one reply packet where the destination information of a transmission origin are consolidated. Accordingly, even in the case of monitoring the communication of a plurality of terminal devices, the central apparatus does not have to transmit the request packet for each terminal device and it does not have to receive the reply packet to be returned for each terminal device, so that it is possible to decrease a pressure of a network band due to the request packet and the reply packet monitoring continuation and blockade of the network.

The above and further objects and features of the invention will more fully be apparent from the following detailed description with accompanying drawings.

BRIEF DESCRIPTION OF THE SEVERAL VIEWS OF THE DRAWINGS

FIG. 6 is a view showing an example of the data structure of a request packet of the network communication monitoring system according to the first embodiment of the present invention;

FIG. 9 is a view showing an example of the data structure of a reply bit map;

DETAILED DESCRIPTION OF THE INVENTION

In the case of applying the above-described conventional monitoring system to a large-scale network to which many terminal devices 3, 3, . . . are connected, a traffic of a communication wire from a monitoring apparatus 1 to the first relay unit 2 is too much when many request packets are transmitted at the same time by issuing Ping commands to the terminal devices 3, 3, . . . at the same time or when reply command to the request packets due to the Ping commands are returned intensively to the monitoring apparatus 1, and this involves a problem to compress a network band for use in the original data communication.

In other words, this involves a problem such that, due to transmitting and receiving of the request packet by the communication monitoring command for checking continuation and blockade of the network and the reply packet corresponding to the request packet, the more the network comes close to the monitoring apparatus 1, the more the load of the network is increased and the more the network band used for the data communication is occupied; and the data communication cannot be carried out.

Accordingly, even in a monitoring system regularly issuing a Ping command, a period of time issuing the Ping command is limited and this involves a problem such that the Ping command cannot be issued at a high traffic originally having a great need to check continuation and blockade of the network.

The present invention has been made taking the foregoing problems into consideration and an object of which is to provide a network communication monitoring system, a network communication monitoring method, a central apparatus, a relay unit, and a recording medium having a computer program recorded, which can decrease a network load by transmitting a request packet having a new data structure consolidating the destination information for transmitting a request packet when a Ping command is issued and returning a reply packet having a new data structure consolidating the destination information of a transmission origin upon reply in the same way. The embodiments of the present invention will be described in detail below with reference to the drawings.

First Embodiment

Figure 1:
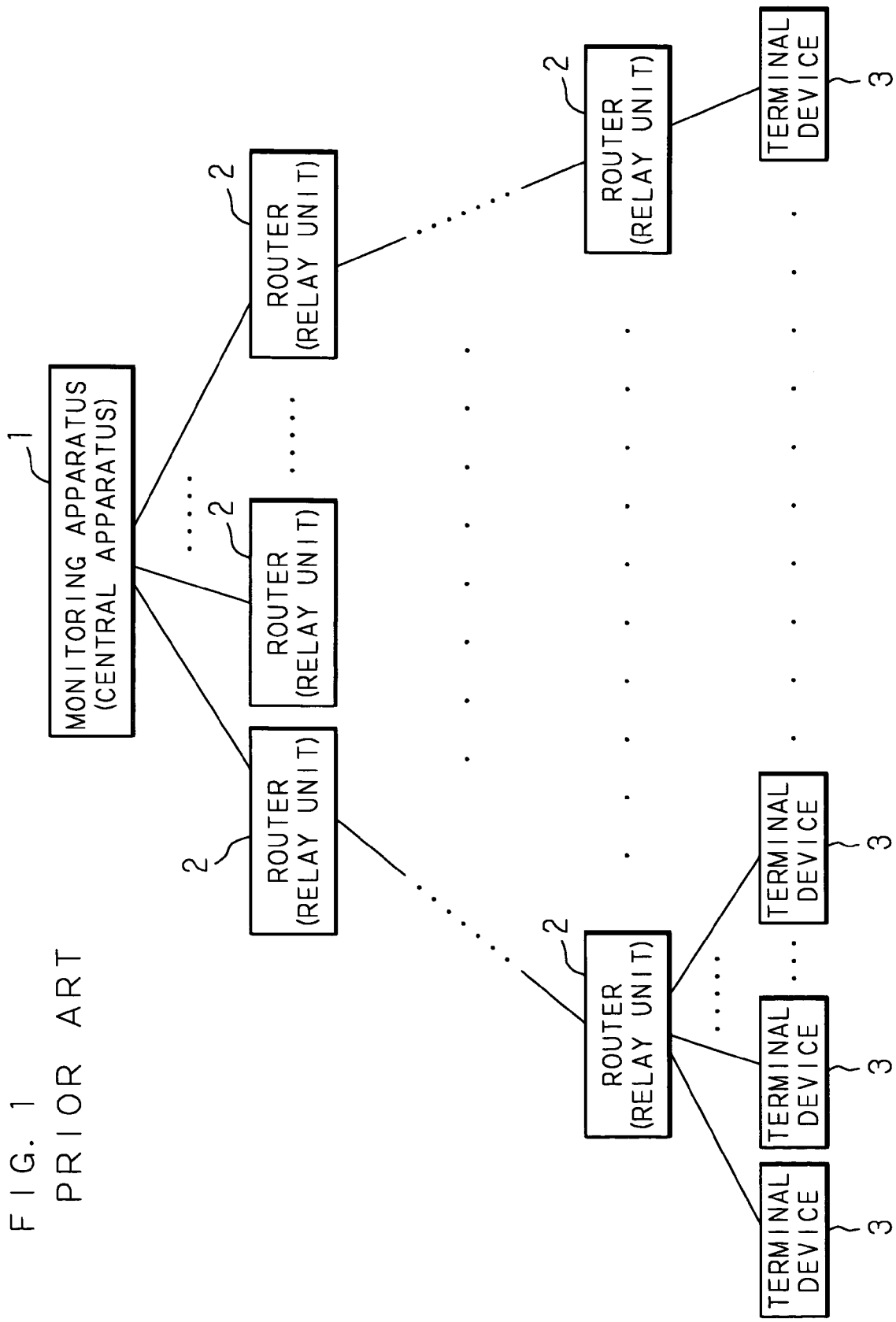
FIG. 1 is a block diagram showing a structure of a monitoring system of a conventional network.
Figure 2:
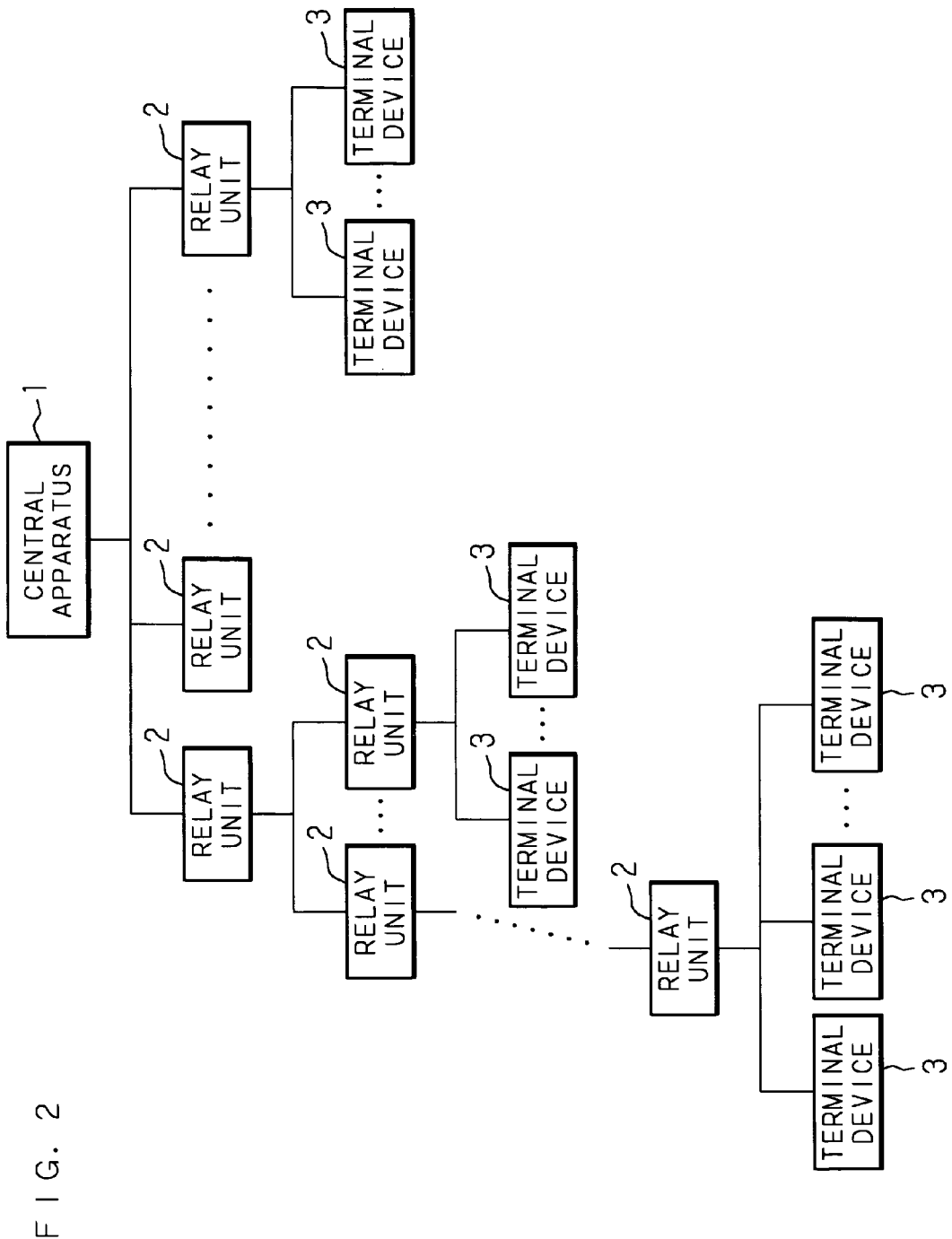
FIG. 2 is a block diagram showing a structure of a network communication monitoring system according to a first embodiment of the present invention.

FIG. 2 is a block diagram showing a structure of a network communication monitoring system according to a first embodiment of the present invention. As shown in FIG. 2, the network communication monitoring system according to the first embodiment of the present invention may transmit a request packet at least by a Ping (communication monitoring) command and in this system, a central apparatus 1 for receiving a reply packet is connected to relay units 2, 2, . . . for relaying a request packet and a reply packet so as to permit data communication with each other. The relay units 2, 2, . . . are connected with each other in a hierarchical fashion and a plurality of terminal devices 3, 3, . . . having the same network classes are connected to the relay units 2, 2, . . . at the lowest layer so as to permit data communication with each other.

Figure 3:
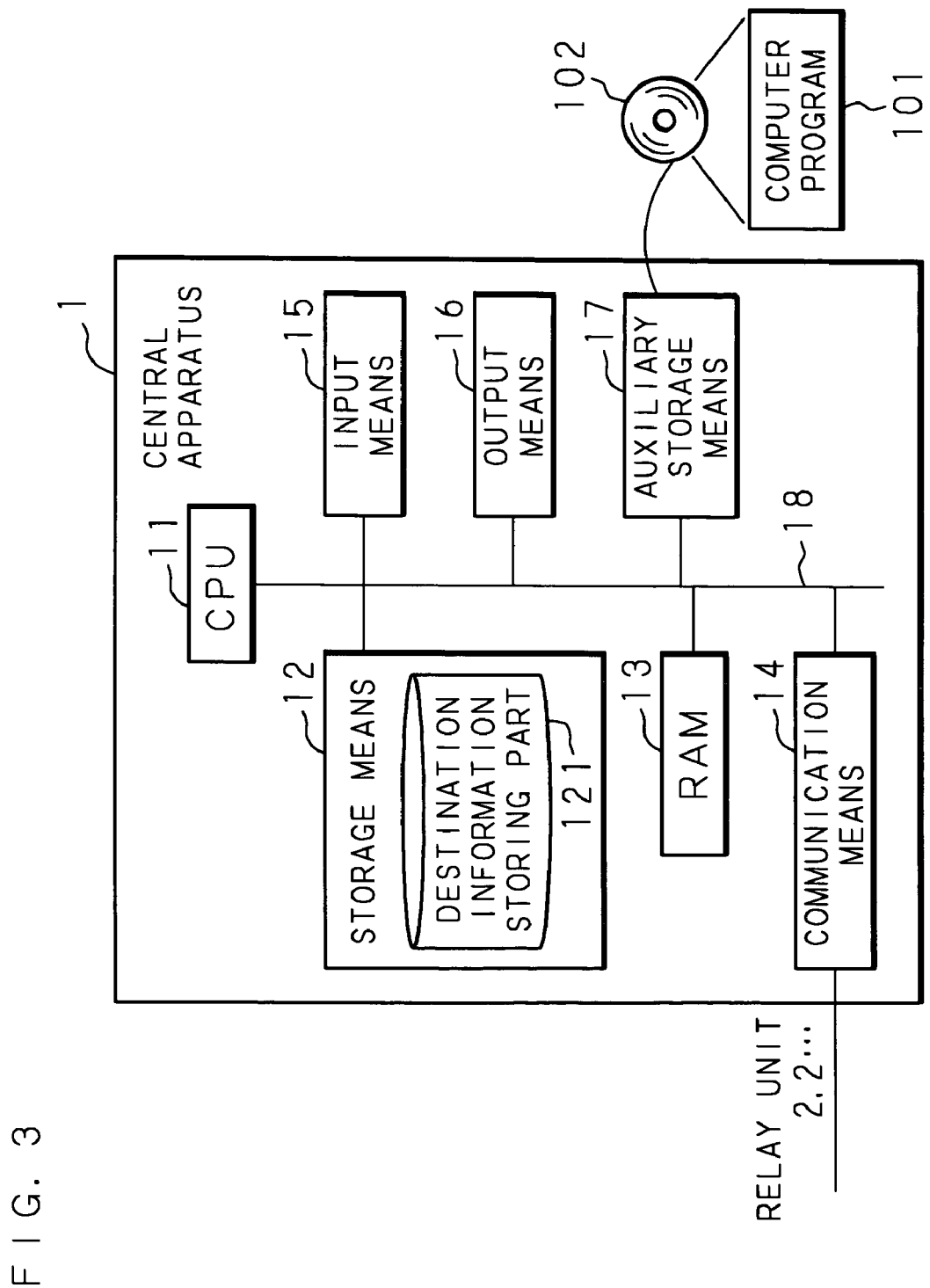
FIG. 3 is a block diagram showing a structure of a central apparatus of the network communication monitoring system according to the first embodiment of the present invention.

FIG. 3 is a block diagram showing the structure of the central apparatus 1 of the network communication monitoring system according to the first embodiment of the present invention. The central apparatus 1 is configured by at least a CPU (central processing unit) 11, a storage means 12, a RAM (memory) 13, a communication means 14 connected to the outside so as to permit data communication with each other, an input means 15 such as a mouse and a key board, an output means 16 such as a monitor, and an auxiliary storage means 17.

The CPU 11 is connected to each part of hardware of the central apparatus 1 as described above via an internal bus 18, and the CPU 11 may control each part of the above-described hardware and may carry out various software functions in accordance with a computer program 101 stored in the storage means 12. As the computer program 101 stored in the storage means 12, one which has been already stored in the storage means 12 upon shipment of the central apparatus 1 is available and one which is stored in the storage means 12 via the auxiliary storage means 17 by using a transportable type of a recording medium 102 such as a DVD and a CD-ROM is also available.

The storage means 12 is a fixed-type of a recording medium represented by a hard disk and is a storage means for storing the computer program 101 to be executed and the data or the like used for the computer program 101 to be executed. The storage means 12 is provided with a destination information storing part 121 which has stored the destination information necessary for generating the Ping command. The address RAM 13 is configured by a SRAM and a flash memory or the like and it may store temporal data generated upon execution of software.

The communication means 14 is connected to the internal bus 18 and it may transmit and receive the data necessary for processing being connected to a cable such as a LAN and a WAN. The input means 15 is connected to the internal bus 18 and it is configured by a pointing device such as a mouse and a tablet and a key input device or the like represented by a keyboard or the like. The output means 16 is connected to the internal bus 18 and it is configured by a liquid crystal display and a CRT display or the like.

Figure 4:
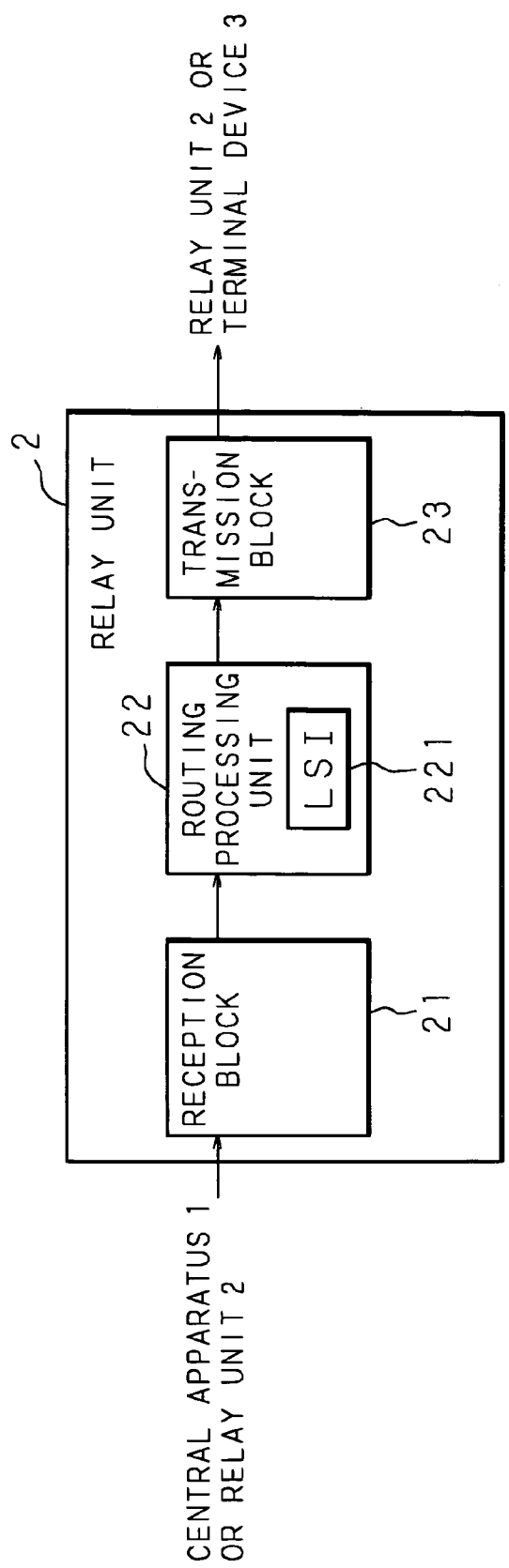
FIG. 4 is a block diagram showing a structure of a relay unit of the network communication monitoring system according to the first embodiment of the present invention.

FIG. 4 is a block diagram showing the structure of the relay unit 2 of the network communication monitoring system according to the first embodiment of the present invention. The relay unit 2 is configured by at least a reception block 21, a routing processing unit 22, and a transmission block 23.

The reception block 21 may receive the data transmitted from the central apparatus 1, other relay units 2, 2, . . . or other terminal devices 3, 3, . . . via network and the routing processing unit 22 may perform the routing processing to route the data to the next relay unit 2 or terminal device 3. In other words, the routing processing unit 22 is provided with an LSI 221 to perform the calculation processing. The routing processing unit 22 may analyze the received request-packet and determine if the destination information of the terminal devices 3, 3, . . . designated by the request packet indicate the relay unit 2 at the lowest layer or not so as to specify the destination information to transfer the received request packet. In addition, analyzing the received reply packet and determining if the destination information of the terminal devices 3, 3, . . . designated by the reply packet indicate the relay unit 2 at the lowest layer or not, the routing processing unit 22 may generate a consolidated reply packet for returning the received packet to the central apparatus 1. Then, the transmission block 23 may transfer the received data to the specified transfer destination. Further, a computer program to be executed by the routing processing unit 22 can be updated being downloaded to the incorporated memory (not illustrated) via the reception block 21.

Figure 5:
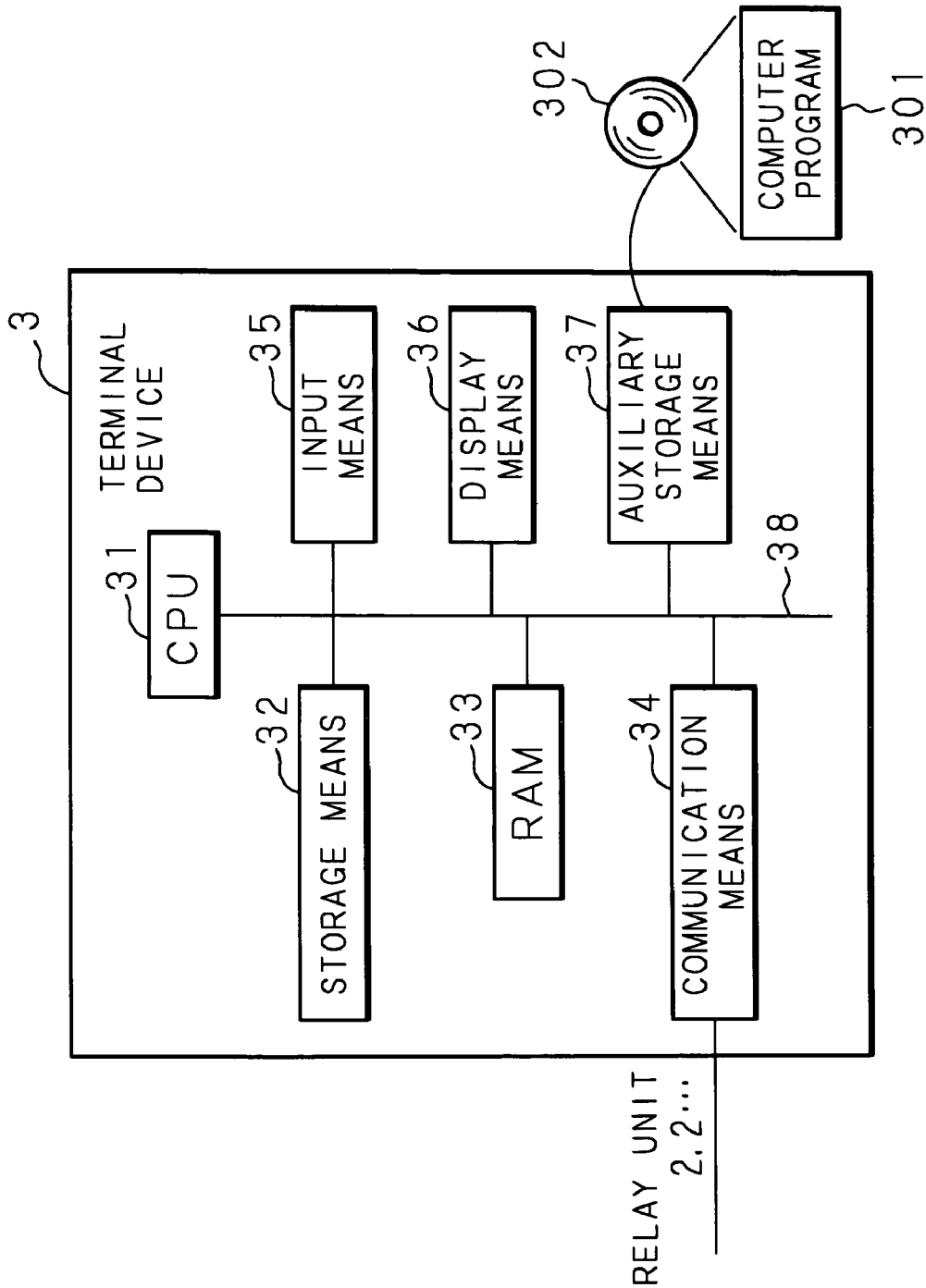
FIG. 5 is a block diagram showing a structure of a terminal device of the network communication monitoring system according to the first embodiment of the present invention.

FIG. 5 is a block diagram showing the structure of the terminal device 3 of the network communication monitoring system according to the first embodiment of the present invention. The terminal device 3 is configured by at least a CPU (central processing unit) 31, a storage means 32; a RAM (memory) 33, a communication means 34 connected to the outside so as to permit data communication with each other, an input means 35 such as a mouse and a key board, and a display means 36 such as a monitor.

The CPU 31 is connected to each part of hardware of the central apparatus 1 as described above via an internal bus 38, and the CPU 31 may control each part of the above-described hardware and may carry out various software functions in accordance with a computer program 301 stored in the storage means 32. The storage means 32 is a fixed-type of a recording medium represented by a hard disk and is a storage means for storing the computer program 301 to be executed and the data or the like used for the computer program 301 to be executed. The RAM 33 is configured by a SRAM and a flash memory or the like and it may store temporal data generated upon execution of software.

The communication means 34 is connected to the internal bus 38 and it may transmit and receive the data necessary for processing being connected to a cable such as a LAN and a WAN. The input means 35 is connected to the internal bus 38 and it is configured by a pointing device such as a mouse and a tablet and a key input device represented by a keyboard or the like. The display means 36 is connected to the internal bus 38 and it is configured by a liquid crystal display and a CRT display or the like.

In the communication monitoring system of the above-described structure, the central apparatus 1 may transmit the request packet by the Ping command, and when the request packet arrives at the terminal devices 3, 3, . . . which are relevant to the address designated by the Ping command, the reply packet is returned from these terminal devices 3, 3, . . . The Ping command may be issued as (a mathematical expression 1) being combined with the IP address, for example, when the IP address of the transmission destination of the request packet is 10.1.3.255.

Ping10.1.3.255          (Mathematical Expression 1)

Conventionally, one Ping command is issued for each IP address and one request packet is transmitted for each IP address. In addition, one reply packet to be returned in response to the request command is returned for each IP address. Accordingly, when the network grows in size, the network band of the communication line to connect the central apparatus 1 with the relay units 2, 2, . . . is seized by the request packet and the reply packet for monitoring the communication and it is feared that the data communication which is the original object of the invention cannot be made. According to the first embodiment, the IP address which is the destination information is consolidated by the request packet and the reply packet to be transferred to a plurality of terminal devices 3, 3, . . . FIG. 6 is a view showing an example of the data structure of a request packet of the network communication monitoring system according to the first embodiment of the present invention.

As shown in FIG. 6, in a MAC header, the issue origin of the Ping command, namely, the IP address of the central apparatus 1 which is the transmission origin of the request packet and the IP address of the terminal device 3 which is the destination address are stored. In the IP header, a broadcast address or the address of the nearest relay unit 2 is stored. Further, these address information are stored in a destination information storing part 121 of the storage means 12 and the CPU 11 of the central apparatus 1 read and set them.

In a type, the flag information indicating if the request packet is transmitted by a normal Ping command or not is stored. For example, when the request packet is transmitted by the normal Ping command, "0" is set, and when the request packet is transmitted by the Ping command having the destination addresses consolidated (hereinafter, referred to as a consolidated Ping command) as the first embodiment, "1" is set. A code indicates a kind of a packet and a process number indicates the process number for identifying the process in which the consolidated Ping command is executed by the central apparatus 1.

A Ping transmission number indicates a transmission number of the consolidated Ping command, and a CRC indicates a check bit. In the request packet according to the first embodiment, the consolidated Ping transmission data to set the consolidated destination information is stored in a data area where a predetermined data row is set when the request packet is transmitted by the normal Ping command.

For the consolidated Ping transmission data, a request/reply flag to distinguish between the request packet and the reply packet, a consolidated Ping start address to indicate a typical address of the destination class of the consolidated Ping command, a consolidated Ping net mask to designate a plurality of IP addresses to be consolidated, and the number of times of reply to acknowledge the replay by the consolidated Ping command are set. For example, supposing that the consolidated Ping start address is 10.1.3.0 and the consolidated Ping net mask is 255.255.255.0, this means that the destination address designated by the consolidated Ping command is in the range of 10.1.3.1 to 10.1.3.255.

Figure 7:
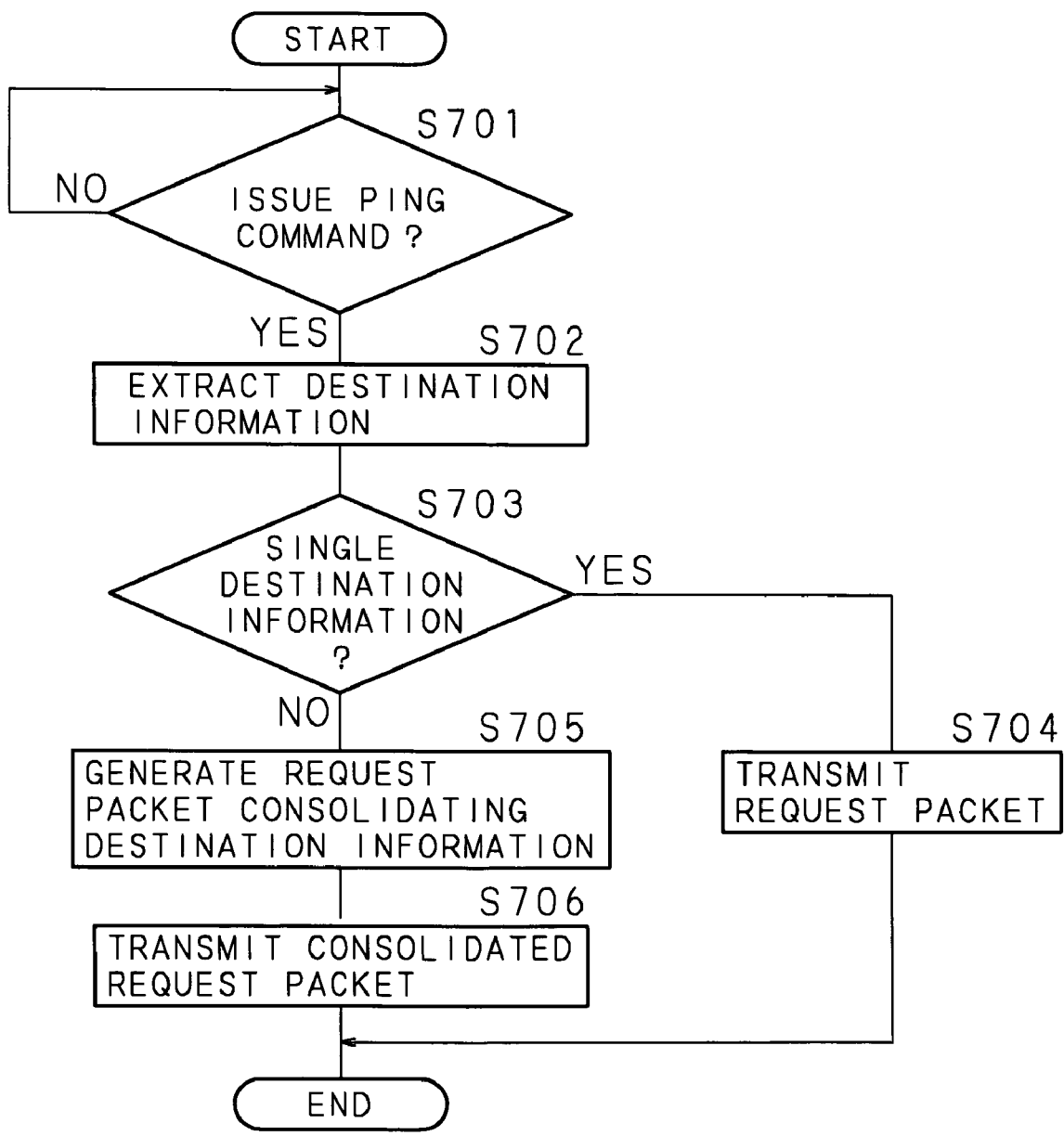
FIG. 7 is a flow chart showing a procedure of a request packet generating process of a CPU of a central apparatus of the communication monitoring system according to the first embodiment of the present invention.

FIG. 7 is a flow chart showing a procedure of a request packet generating process of the CPU 11 of the central apparatus 1 of the communication monitoring system according to the first embodiment of the present invention. The CPU 11 of the central apparatus 1 may determine if the Ping command is issued or not (step S701). Then, if the CPU 11 determines that the Ping command is issued (step S701: YES), the CPU 11 may extract the designated destination information (step S702).

The CPU 11 may determine if the extracted destination information is single destination information, for example, the single IP address or not (step S703). A method of determining if the destination information is the single destination information or not is not particularly limited. For example, in the case that the destination information is the IP address, a command format of the consolidated Ping command is a command format indicated by (a mathematical expression 2), the CPU 11 can determine if the extracted destination information is single destination information or not depending on that "—(a hyphen)" is included in the designated destination information or not.

Ping10.1.3.1–255          (Mathematical Expression 2)

When the CPU 11 determines that the extracted destination information is the single destination information (step S703:

YES), the CPU 11 may determine that the normal Ping command is issued and may transmit the normal request packet to the designated destination information (step S704). In the case that the CPU 11 determines that the extracted destination information is not the single destination information (step S703: NO), the CPU 11 may determine that the consolidated Ping command is issued, may generate a request packet having the data structure shown in FIG. 6 by consolidating the designated destination information (step S705), and may transmit the generated request packet (step S706).

Receiving the request packet transmitted from the central apparatus 1, the relay unit 2 may analyze the consolidated Ping transmission data included in the request packet and then, the relay unit 2 may determine if it transfers the request packet as it is or dissolves it into a plurality of request packets. In other words, in the case that the request packet is a packet which is transmitted by issuing the normal Ping command, the CPU 11 may transfer the request packet to the relay unit 2 to which the terminal device 3 corresponding to the designated destination information is directly connected and may transmit the request packet to the terminal device 3.

In addition, in the case that the request packet is the packet which is transmitted when the consolidated Ping command is issued, transferring the request packet to the relay unit 2 to which the terminal device 3 corresponding to the designated destination information is directly connected and dividing it into the request packet having the normal data structure for each terminal device 3 by the relay unit 2, the CPU 11 may transmit each request packet to the terminal devices 3, 3, . . . . This allows one request packet having the consolidated destination information to be only transmitted till the relay unit 2 to which the terminal device 3 is directly connected, so that the network band is not compressed.

Figure 8:
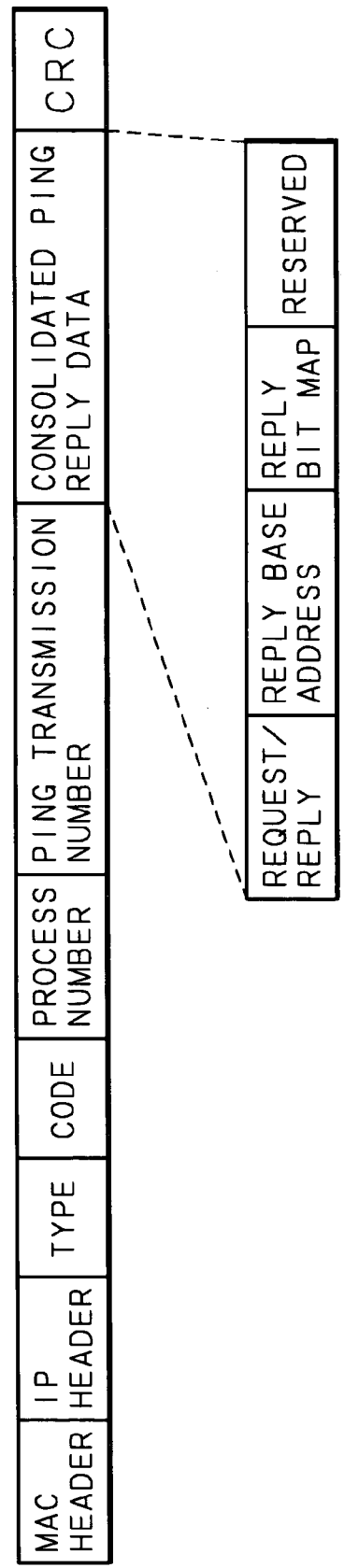
FIG. 8 is a view showing an example of the data structure of a reply packet of the network communication monitoring system according to the first embodiment of the present invention.

In the same way, receiving the reply packet to the request packet for each terminal device 3, the relay unit 2 may generate one reply packet by consolidating the transmission origin information of the reply packet from the terminal devices 3, 3, . . . belonging to the same network class. FIG. 8 is a view showing an example of the data structure of a reply packet of the network communication monitoring system according to the first embodiment of the present invention.

As shown in FIG. 8, in the MAC header, the issue origin of the consolidated Ping command, namely, the IP address of the central apparatus 1 which is the transmission origin of the request packet and the IP address of the terminal device 3 which is the destination address are stored. In the IP header, a broadcast address or the address of the nearest relay unit 2 is stored.

In a type, the flag information indicating if the reply packet is transmitted by a normal consolidated Ping command or not is stored. For example, when the reply packet is transmitted by the normal Ping command, "0" is set, and when the reply packet is transmitted by the consolidated Ping command, "1" is set. A code indicates a kind of a packet and a process number indicates the process number for identifying the process in which the consolidated Ping command is executed by the central apparatus 1.

A Ping transmission number indicates a transmission number of the consolidated Ping command, and a CRC indicates a check bit. In the reply packet according to the first embodiment, the consolidated Ping reply data to set the consolidated destination information is stored in a data area where a predetermined data row is set when the reply packet is transmitted by the normal Ping command.

For the consolidated Ping reply data, a request/reply flag to distinguish between the request packet and the reply packet, a reply base address indicating a typical address of the reply packet to the consolidated Ping command, and a reply bit map indicating with or without of the reply are set. FIG. 9 is a view showing an example of the data structure of a reply bit map.

As shown in FIG. 9, in the case that the reply base address is set at 10.1.3. X in the reply packet, the reply bit map may generate a reply packet making the reply bit responsive to the value of X corresponding to a bit mask. In the example shown in FIG. 9, X is within a range of 1 to 255 and the reply bit "0" or "1" is set with respect to each IP address of 10.1.3.1 to 10.1.3.255. The reply bit "0" means that the relay unit 2 does not receive the reply packet even after a certain period of time and the reply bit "1" means that the relay unit 2 receives the reply packet, respectively.

Figure 10:
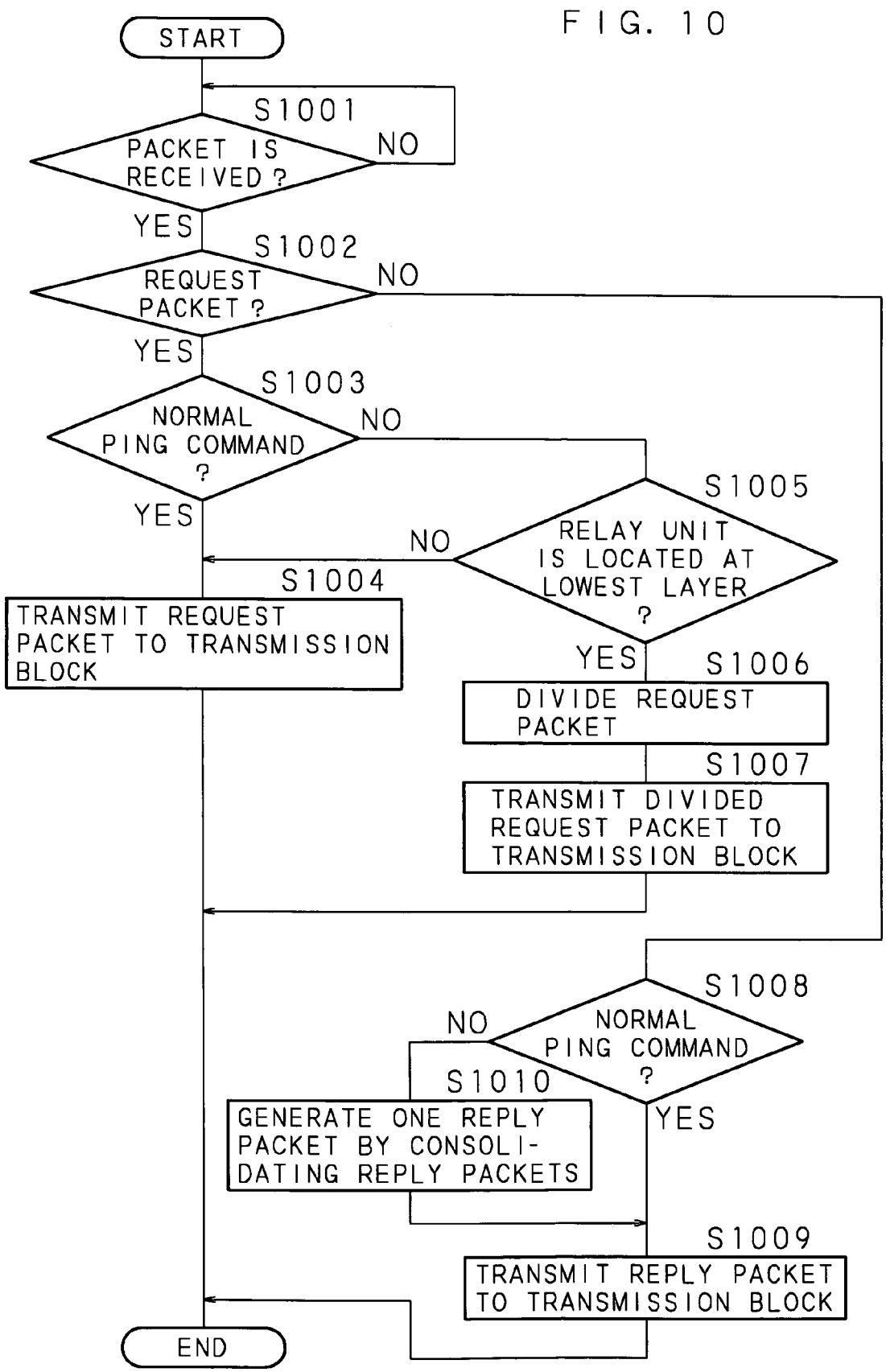
FIG. 10 is a flow chart showing a procedure of the relay processing of an LSI of a routing processing unit of a relay unit of the communication monitoring system according to a second embodiment of the present invention.

By returning the generated reply packet to the central apparatus 1, it is enough for the relay unit 2 to return only one reply packet although a plurality of reply packets are returned conventionally and this makes it possible to avoid compression of the network band in the vicinity of the central apparatus 1. FIG. 10 is a flow chart showing a procedure of the relay processing of the LSI 221 of the routing processing unit 22 of a relay unit 2 of the communication monitoring system according to a second embodiment of the present invention.

The LSI 221 of the routing processing unit 22 may determine if it receives the packet or not (step S1001), and when the LSI 221 determines that the packet is received (step S1001: YES), the LSI 221 determines if the received packet is the request packet or not (step S1002). A method of determining if the received packet is the request packet or not is not particularly limited. For example, it may be determined on the basis of the request/reply flag. When the LSI 221 determines that the received packet is the request packet (step S1002: YES), the LSI 221 may determine if it is the request packet transmitted by the normal Ping command or not (step S1003).

When the LSI 221 determines that it is the request packet transmitted by the normal Ping command (step S1003: YES), the LSI 221 may transmit the received request packet to the transmission block 23 as it is (step S1004). The transmission block 23 may transfer the received request packet to the next relay unit 2 or terminal device 3.

When the LSI 221 determines that it is not the request packet transmitted by the normal Ping command (step S1003: NO), the LSI 221 determines that the received request packet is one having the destination information consolidated and further, the LSI 221 determines if the self IP address is designated one at the lowest layer or not (step S1005). When the LSI 221 determines that it is not the IP address at the lowest layer (step S1005: NO), the LSI 221 may transmit the received packet to the transmission block 23 as it is (step S1004). The transmission block 23 may transfer the received request packet to the next relay unit 2.

When the LSI 221 determines that it is the IP address at the lowest layer (step S1005: YES), the LSI 221 may divide the received request packet into a plurality of request packets for each destination information (step S1006), and may transmit the divided plural request packets to the transmission block 23 (step S1007). The transmission block 23 may transmit the request packets to a plurality of terminal devices 3, 3, . . . , respectively.

When the LSI 221 determines that the received packet is not the request packet (step S1002: NO), the LSI 221 determines that it receives the reply packet, and it determines if the reply packet is one with respect to the request packet transmitted from the normal Ping command or not (step S1008). When the LSI 221 determines that the reply packet is one with respect to the request packet transmitted from the normal Ping command (step S1008: YES), the LSI 221 may transmit the reply packet to the transmission block 23 as it is (step S1009).

The transmission block 23 may transfer the received reply packet to the next relay unit 2 or the central apparatus 1.

When the LSI 221 determines that the received packet is not the reply packet with respect to the request packet transmitted from the normal Ping command (step S1008: NO), the LSI 221 determines that the received reply packet is one corresponding to the request command generated by the consolidated Ping command, and consolidating the destination information of the received plural reply packets, the LSI 221 may generate one reply packet having the data structure as shown in FIG. 8 (step S1010). The LSI 221 may transmit the generated one reply packet to the transmission block (step S1009). The transmission block 23 may transfer the received reply packet to the next relay unit 2 or the central apparatus 1.

Figure 11:
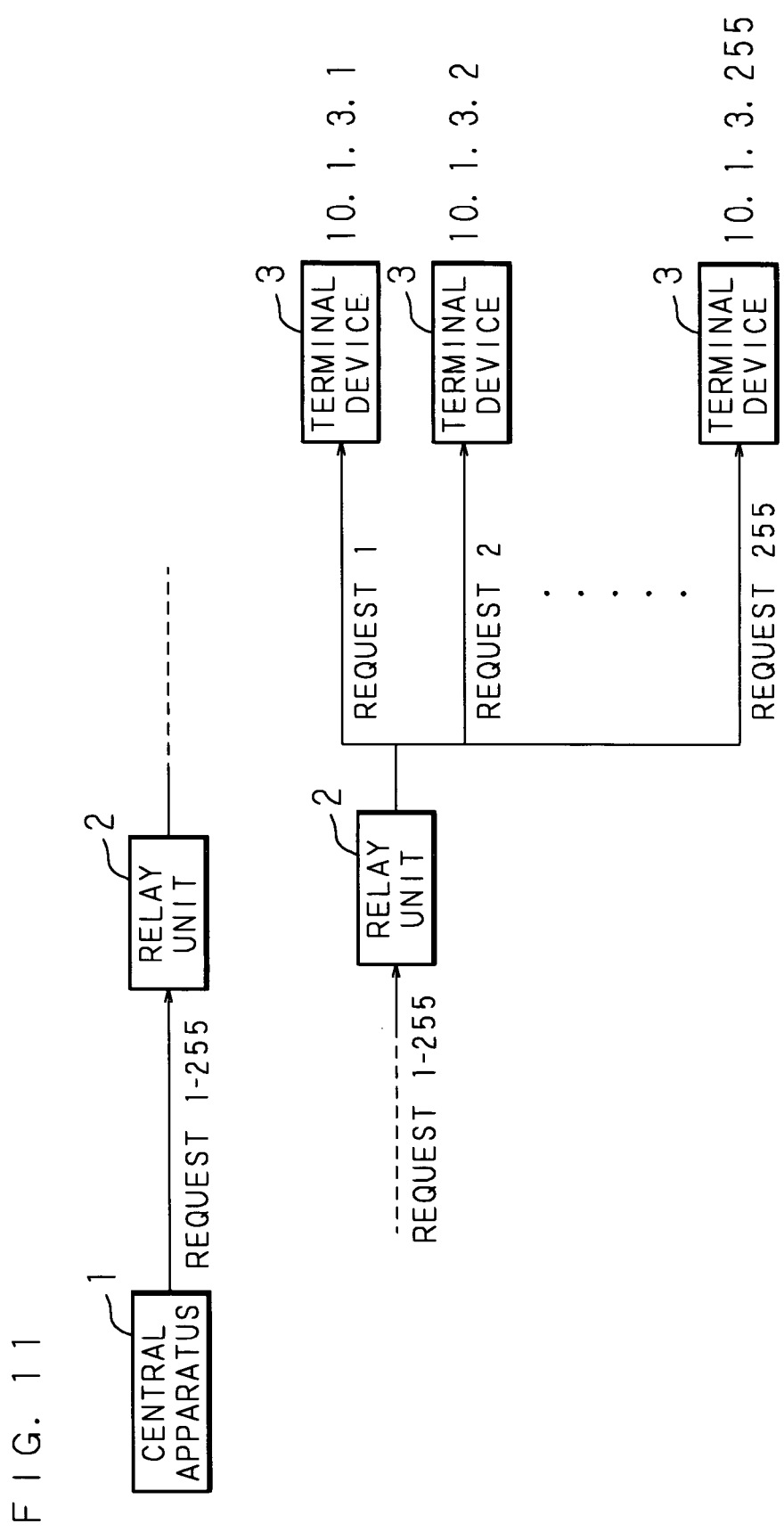
FIG. 11 is a view exemplarily illustrating the state of the request packet to be transmitted and received.

FIG. 11 is a view exemplarily illustrating the state of the request packet to be transmitted and received according to the above-described processing. For example, when the central apparatus 1 issues the consolidated Ping command having 255 pieces of the IP addresses to the terminal devices 3, 3, . . . of which typical address is 10.1.3.0, the CPU 11 of the central apparatus 1 may generate a request packet having 255 IP addresses consolidated and may transmit them to the relay units 2, 2, . . . . Further, in FIG. 11, "a request 1-255" indicates the request packet which is generated by the consolidated Ping command with respect to the terminal devices 3, 3, . . . of which IP address is in the range of 10.1.3.1 to 10.1.3.255. "A request 1", "a request 2", . . . , and "a request 255" indicate the request packets with respect to the IP addresses, 10.1.3.1, 10.1.3.2, . . . 10.1.3.255, respectively.

In the case that the request packet, "the request 1-255" is received by the relay units 2 having the IP addresses, 10.1.3.1, 10.1.3.2, . . . , 10.1.3.255, which are directly connected to the terminal devices 3, 3, . . . , the relay unit 2 may divide this request packet into 255 pieces of request packets and may transmit the request packets, "the request 1", "the request 2", . . . , and "the request 255" for each terminal device 3. Accordingly, only one consolidated request packet is transmitted till the relay units 2 having the IP addresses, 10.1.3.1, 10.1.3.2, . . . , 10.1.3.255, which are directly connected to the terminal devices 3, 3, . . . , the network band is not seized by the packet for monitoring the communication and it is possible to check the communication state to the terminal devices 3, 3, . . . while securing a stable communication band.

Figure 12:
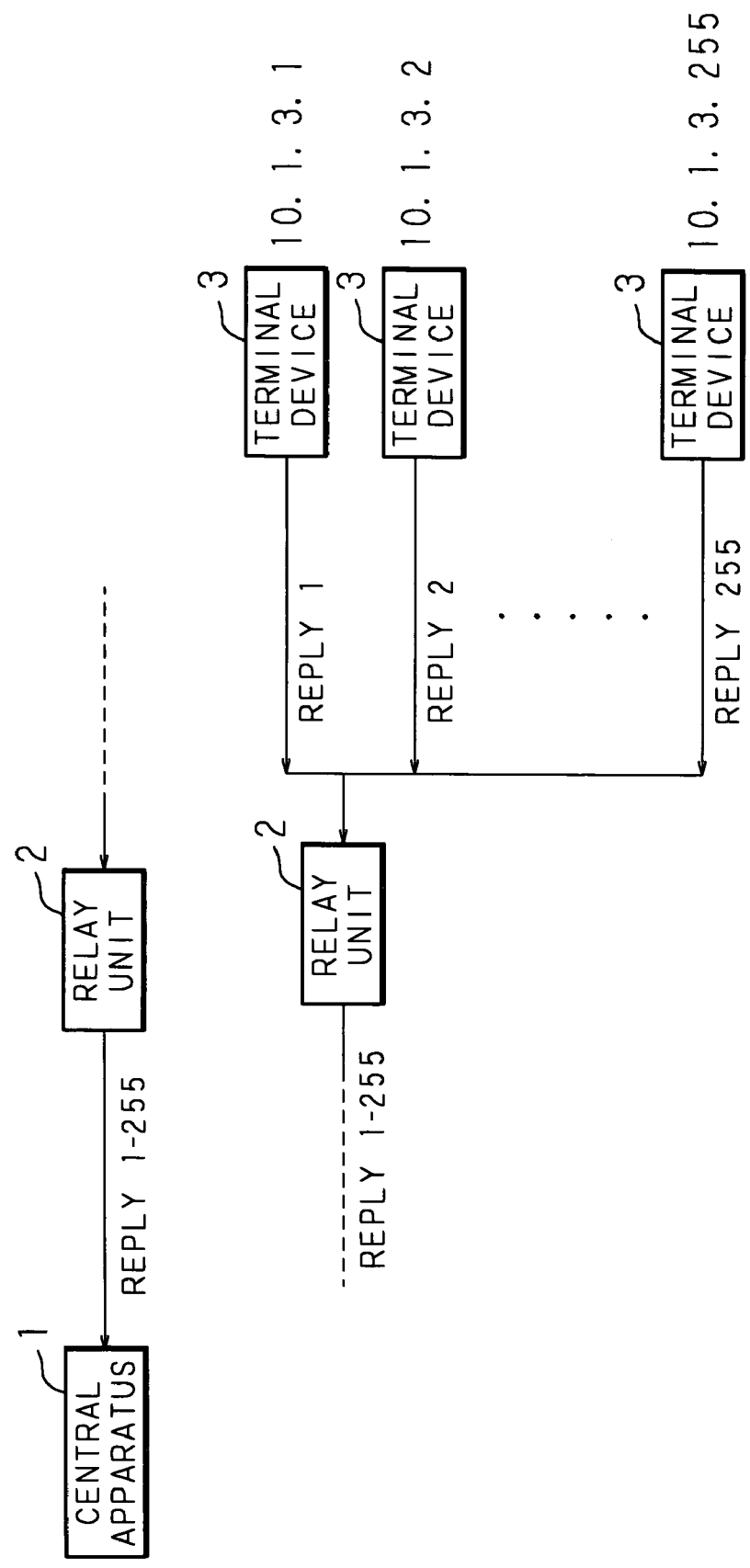
FIG. 12 is a view exemplarily illustrating the state of the reply packet to be transmitted and received.

FIG. 12 is a view exemplarily illustrating the state of the reply packet to be transmitted and received according to the above-described processing. For example, in the case that the central apparatus 1 issue the consolidated Ping command having 255 pieces of IP addresses to the terminal devices 3, 3, . . . having the typical addresses, 10.1.3.0 and the divided request packet shown in FIG. 11 is transmitted for each terminal device 3, the relay unit 2 may receive a plurality of reply packets from a plurality of terminal devices 3, 3, . . . Further, in FIG. 12, "a reply 1-255" indicates the reply packet responding to the request packet which is generated by the consolidated Ping command with respect to the terminal devices 3, 3, . . . having the IP addresses in the range of 10.1.3.1 to 10.1.3. 255, and "a reply 1", "a reply 2", . . . , "a reply 255" indicate reply packets responding to the request packets with respect to the IP addresses, 10.1.3.1, 10.1. 32, . . . , 10.1.3.255, respectively.

In the case that a plurality of reply packets, "the reply 1", "the reply 2", . . . , "the reply 255" are received by the relay units 2 having the IP addresses, 10.1.3.1, 10.1.3.2, . . . , 10.1.3.255, which are directly connected to the terminal devices 3, 3, . . . , the relay unit 2 may consolidate 255 pieces of reply packets into a single reply packet, "the reply 1-255" and may transmit one reply packet, "the replay 1-255" to the central apparatus 1 via the relay units 2, 2, . . . at the upper hierarchies. Accordingly, although a plurality of reply packets are transmitted from the terminal devices 3, 3, . . . having the IP addresses, 10.1.3.1, 10.1.3.2, . . . , 10.1.3.255, to the relay unit 2 which is directly connected to these terminal devices 3, 3, . . . , only one consolidated reply packet is transmitted on and after the relay unit 2. Therefore, the network band is not seized by the packet for monitoring the communication and it is possible to check the communication state to the terminal devices 3, 3, . . . while securing a stable communication band.

As described above, according to the first embodiment, it is sufficient to consolidate the destination information of the terminal device transmitting the request packet by the Ping (communication monitoring) command and transmit not a plurality of request packets but one request packet, and it is also sufficient for the reply packet to receive one reply packet consolidating the destination information of the transmission origin. As a result, even in the case of monitoring the communication with respect to a plurality of terminal devices 3, 3, . . . , there is no need to transmit the request packet from the central apparatus 1 for each terminal device 3 and there is no need to receive the reply packet to be returned for each terminal device 3. Therefore, it is possible to decrease compression of the network band by the request packet and the reply packet for monitoring continuation and blockade of the network.

Further, by setting a predetermined value for the number of times of reply of the consolidated Ping transmission data of the request packet shown in FIG. 6, the relay unit 2 or the terminal device 3 can receive the reply packets for the number of times of reply designated with respect to one time of request packet transmission. Accordingly, although a large amount of reply packets are received by the normal Ping command, it is sufficient to receive the reply packets consolidated to the designated number of times by consolidating the reply packets and it is obvious that the effect to decrease the compression of the network band is more improved.

Second Embodiment

Hereinafter, the network communication monitoring system according to the second embodiment of the present invention will be described with reference to the drawings. Since the structure of the network communication monitoring system according to the second embodiment of the present invention is the same as that of the first embodiment, the same reference numerals are given and the detailed explanation is herein omitted. The present second embodiment is different from the first embodiment in that the central apparatus 1 generates a request packet so that a waiting time from the consolidated request packet is generated and transmitted till the consolidated reply packet is received can be set.

Figure 13:
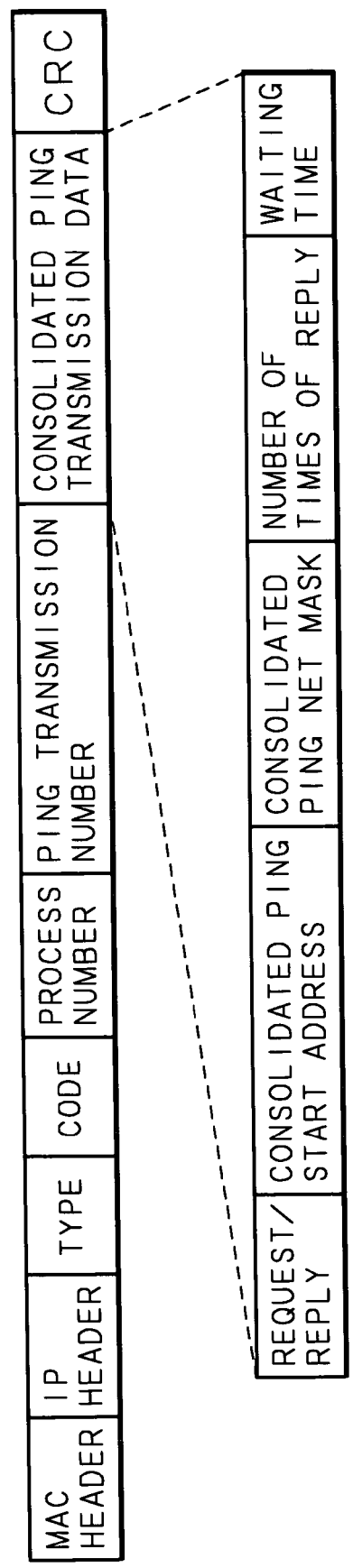
FIG. 13 is a view showing an example of the data structure of a request packet of the network communication monitoring system according to the second embodiment of the present invention.

FIG. 13 is a view showing an example of the data structure of a request packet of the network communication monitoring system according to the second embodiment of the present invention. As same as the first embodiment, in the MAC header, the issue origin of the Ping command, namely, the IP address of the central apparatus 1 which is the transmission origin of the request packet and the IP address of the terminal device 3 which is the destination address are stored. In the IP header, a broadcast address or the address of the nearest relay unit 2 is stored. Further, these address information are stored in a destination information storing part 121 of the storage means 12 and the CPU 11 of the central apparatus 1 read and set them.

In a type, the flag information indicating if the request packet is transmitted by a normal Ping command or not is stored. For example, when the request packet is transmitted by the normal Ping command, "0" is set, and when the request packet is transmitted by the Ping command having the destination addresses consolidated (hereinafter, referred to as a consolidated Ping command) as the first embodiment, "1" is set. A code indicates a kind of a packet and a process number indicates the process number for identifying the process in which the consolidated Ping command is executed by the central apparatus 1.

A Ping transmission number indicates a transmission number of the consolidated Ping command, and a CRC indicates a check bit. In the request. packet according to the first embodiment, the consolidated Ping transmission data to set the consolidated destination information is stored in a data area where a predetermined data row is set when the request packet is transmitted by the normal Ping command.

For the consolidated Ping transmission data, a request/reply flag to distinguish between the request packet and the reply packet, a consolidated Ping start address to indicate a typical address of the destination class of the consolidated Ping command, a consolidated Ping net mask to designate a plurality of IP addresses to be consolidated, and the number of times of replies to acknowledge the replay by the consolidated Ping command are set. For example, supposing that the consolidated Ping start address is 10.1.3.0 and the consolidated Ping net mask is 255.255.255.0, this means that the destination address designated by the consolidated Ping command is in the range of 10.1.3.1 to 10.1.3.255.

Figure 14:
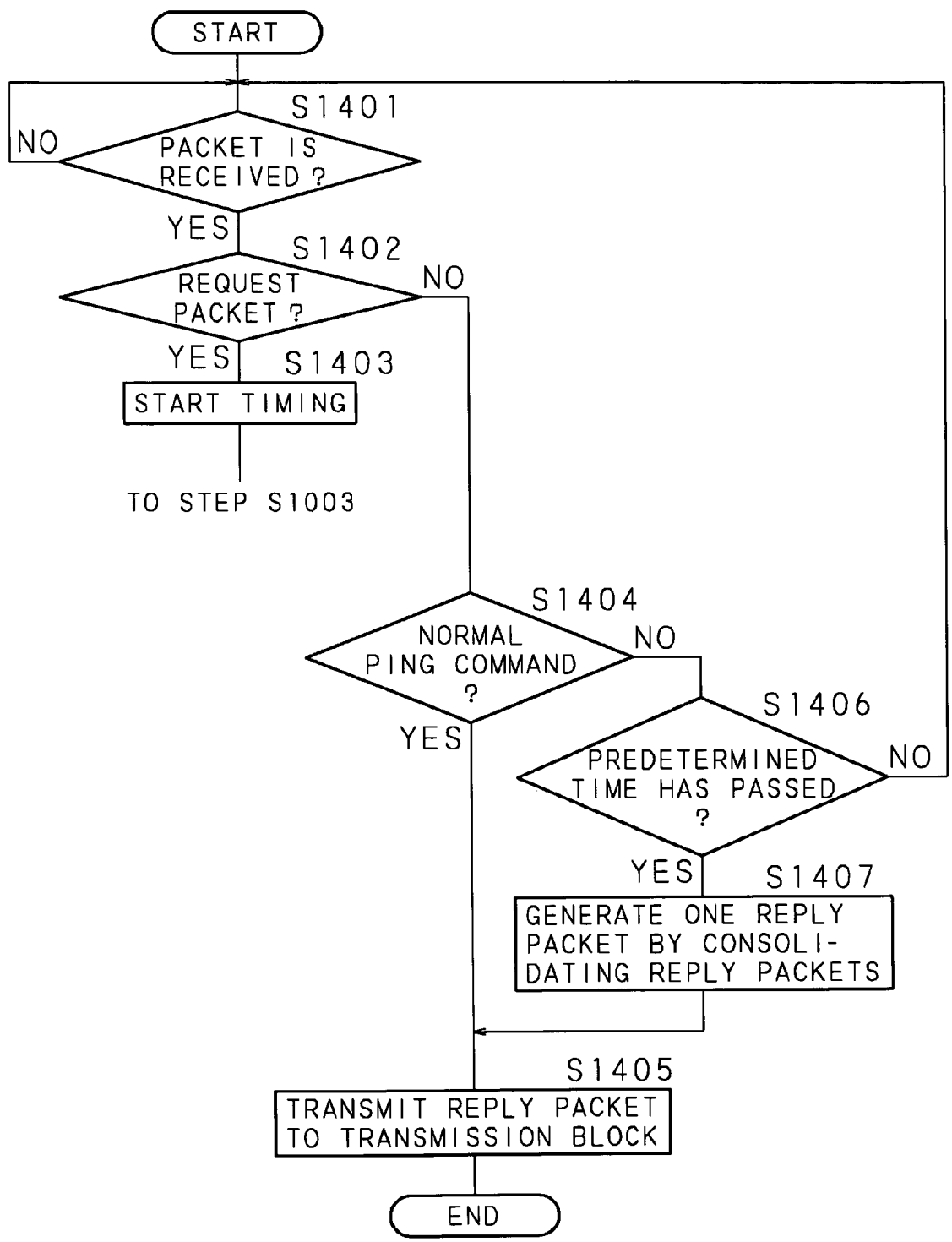
FIG. 14 is a flow chart showing a procedure of the relay process of an LSI of a routing processing unit of a relay unit of the communication monitoring system according to the second embodiment of the present invention.

According to the present second embodiment, it is possible to set the waiting time that is the waiting time of reception of the reply packet in the relay unit 2 for the consolidated Ping transmission data. The relay unit 2 can specify the waiting time of reception of the reply packet by analyzing the request packet and extracting the waiting time. FIG. 14 is a flow chart showing a procedure of the relay process of the LSI 221 of the routing processing unit 22 of the relay unit 2 of the communication monitoring system according to the second embodiment of the present invention.

The LSI 221 of the routing processing unit 22 may determine if it receives the packet or not (step S1401), and when the LSI 221 determines that the packet is received (step S1401: YES), the LSI 221 determines if the received packet is the request packet or not (step S1402). A method of determining if the received packet is the request packet or not is not particularly limited. For example, it may be determined on the basis of the request/reply flag. When the LSI 221 determines that the received packet is the request packet (step S1402: YES), the LSI 221 may start timing by an incorporated timer (step S1403) and may carry out the same processing as the first embodiment. In other words, the LSI 221 may perform the processing on and after step S1003 in FIG. 10.

When the LSI 221 determines that the received packet is not the request packet (step S1402: NO), the LSI 221 determines that it receives the reply packet, and it determines if the reply packet is one with respect to the request packet transmitted from the normal Ping command or not (step S1404). When the LSI 221 determines that the reply packet is one with respect to the request packet transmitted from the normal Ping command (step S1404: YES), the LSI 221 may transmit the reply packet to the transmission block 23 as it is (step S1405). The transmission block 23 may transfer the received reply packet to the next relay unit 2 or the central apparatus 1.

When the LSI 221 determines that the received packet is not the reply packet with respect to the request packet transmitted from the normal Ping command (step S1404: YES), the LSI 221 determines that the received reply packet is one corresponding to the request command generated by the consolidated Ping command, and determines if a predetermined time has passed or not (step S1406). When the LSI 221 determines that a predetermined time has not passed yet (step S1406: NO), the LSI 221 may return the processing to step S1401, may continuously accept the set waiting time, for example, the reply packet for one second, and may repeat the above-described processing.

In the case that the LSI 221 determines that a predetermined time has passed (step S1406: YES), the LSI 221 may generate one reply packet having the data structure shown in FIG. 8 by consolidating the destination information or the like of the received plural reply packets (step S1407). The LSI 221 may transmit the generated one reply packet to the transmission block (step S1405). The transmission block 23 may transfer the received reply packet to the next relay unit 2 or the central apparatus 1.

As described above, according to the present second embodiment, by making the reply packet to wait for reception for a predetermined time, it is possible to prevent the error acknowledgement of a network failure due to a delay of the reply packet by traffic or the like of the network in advance.

As this invention may be embodied in several forms without departing from the sprit of essential characteristics thereof, the present embodiment is therefore illustrative and not restrictive, since the scope of the invention is defined by the appended claims rather than by the description preceding them, and all changes that fall within metes and bounds of claims, or equivalence of such metes and bounds thereof are therefore intended to be embraced by the claims.

What is claimed is:

1. A network communication monitoring system,
   in which a central apparatus and a plurality of terminal devices are connected via a relay unit so as to permit data communication via a plurality of networks; and the central apparatus monitors continuation and blockade of the network connection with respect to the plural terminal devices by transmission and reception of a request packet and a reply packet due to a communication monitoring command,
   wherein the central apparatus comprises:
      means for obtaining destination information of the plural terminal devices;
      means for generating one request packet with obtained plural destination information consolidated; and
      means for transmitting one generated request packet, the relay unit comprises:
      means for receiving the one request packet;
      means for generating a plurality of request packets on the basis of the consolidated destination information;
      means for transmitting the generated request packet;
      means for receiving reply packets from the terminal devices;
      means for generating one reply packet by consolidating the destination information of transmission origins of the received reply packets; and
      means for returning one generated reply packet to the central apparatus, and
   the central apparatus further comprises:
      means for receiving one returned reply packet; and
      means for determining continuation and blockade of the network connection for each terminal device on the basis of the destination information of the consolidated transmission origin.

2. The network communication monitoring system according to claim 1, wherein the central apparatus generates the one request packet including the number of times of reception of the reply packet between the terminal device and the relay unit.

3. The network communication monitoring system according to claim 1,
wherein the central apparatus generates the one request packet including a waiting time from the relay unit transmits the one request packet till the relay unit receives the one reply packet.

4. The network communication monitoring system according to claim 2,
wherein the central apparatus generates the one request packet including a waiting time from the relay unit transmits the one request packet till the relay unit receives the one reply packet.

5. A network communication monitoring system,
in which a central apparatus and a plurality of terminal devices are connected via a relay unit so as to permit data communication via a plurality of networks; and the central apparatus monitors continuation and blockade of the network connection with respect to the terminal devices by transmission and reception of a request packet and a reply packet due to a communication monitoring command, wherein
the central apparatus comprises a processor to perform:
   obtaining destination information of the plural terminal devices;
   generating one request packet with obtained plural destination information consolidated; and
   transmitting a transmission instruction of one generated request packet to a communication means,
the relay unit comprises a processor to perform:
   transmitting a reception instruction of the one request packet to the communication means;
   generating a plurality of request packets on the basis of the consolidated destination information;
   transmitting a transmission instruction of the generated request packet to the communication means;
   transmitting a reception instruction of the reply packets from the terminal devices to the communication means;
   generating one reply packet by consolidating the destination information of transmission origins of the received packets; and
   transmitting a return instruction for returning generated one reply packet to the central apparatus to the communication means, and
the processor of the central apparatus further performs:
   transmitting a reception instruction of the returned one reply packet to the communication means; and
   determining continuation and blockade of the network connection for each terminal device on the basis of the destination information of the consolidated transmission origin.

6. A network communication monitoring method,
in which a central apparatus and a plurality of terminal devices are connected via a relay unit so as to permit data communication via a plurality of networks; and the central apparatus monitors continuation and blockade of the network connection with respect to the plural terminal devices by transmission and reception of a request packet and a reply packet due to a communication monitoring command
the method comprising:
   obtaining destination information of the plural terminal devices by the central apparatus;
   generating one request packet with obtained plural destination information consolidated by the central apparatus; and
   transmitting a transmission instruction of one generated request packet to a communication means by the central apparatus;
   transmitting a reception instruction of the one request packet to the communication means by the relay unit;
   generating a plurality of request packets on the basis of the consolidated destination information by the relay unit;
   transmitting a transmission instruction for transmitting the generated request packet to plurality of terminal devices to the communication means by the relay unit;
   transmitting a reception instruction of the reply packets from the terminal devices to the communication means by the relay unit;
   generating one reply packet by consolidating the destination information of transmission origins of the received reply packets by the relay unit;
   transmitting a return instruction for returning generated one reply packet to the central apparatus to the communication means by the relay unit;
   transmitting a reception instruction of the returned one reply packet to the communication means by the central apparatus; and
   determining continuation and blockade of the network connection for each terminal device on the basis of the destination information of the consolidated transmission origin by the central apparatus.

7. A central apparatus,
in which the central apparatus is connected to a plurality of terminal devices via a relay unit so as to permit data communication via a plurality of networks; and the central apparatus monitors continuation and blockade of the network connection with respect to the terminal devices by transmission and reception of a request packet and a reply packet due to a communication monitoring command, comprising:
means for obtaining destination information of the plural terminal devices;
means for generating one request packet with obtained plural destination information consolidated;
means for transmitting one generated request packet;
means for receiving one reply packet, from the terminal devices, which is generated by consolidating the destination information of transmission origins of a plurality of received reply packets; and
means for determining continuation and blockade of the network connection for each terminal device on the basis of the destination information of the consolidated transmission origins.

8. The central apparatus according to claim 7,
wherein the central apparatus generates the one request packet including the number of times of reception of the reply packet between the terminal device and the relay unit.

9. The central apparatus according to claim 7,
wherein the central apparatus generates the one request packet including a waiting time from the relay unit transmits the one request packet till the relay unit receives the one reply packet.

10. The central apparatus according to claim 8,
wherein the central apparatus generates the one request packet including a waiting time from the relay unit transmits the one request packet till the relay unit receives the one reply packet.

11. A central apparatus,
in which the central apparatus is connected to a plurality of terminal devices via a relay unit so as to permit data communication via a plurality of networks; and the central apparatus monitors continuation and blockade of the network connection with respect to the terminal devices by transmission and reception of a request packet and a reply packet due to a communication monitoring command,
wherein
the central apparatus comprises a processor to perform:
obtaining destination information of the plural terminal devices;
generating one request packet with obtained plural destination information consolidated;
transmitting a transmission instruction of one generated request packet to a communication means;
transmitting a reception instruction of the reply packets, from the terminal devices, which is generated by consolidating the destination information of transmission origins of a plurality of reply packets to the communication means; and
determining continuation and blockade of the network connection for each terminal device on the basis of the destination information of the consolidated transmission origins.

12. A relay unit,
in which a central apparatus and a plurality of terminal devices relay communication made via a plurality of networks, comprising:
means for transmitting a reception instruction of one request packet having a plurality of destination information consolidated to a communication means;
means for generating a plurality of request packets on the basis of the consolidated destination information;
means for transmitting a transmission instruction of the generated request packets to the communication means;
means for transmitting a reception instruction of reply packets from the terminal devices to the communication means;
means for generating one reply packet by consolidating the destination information of the transmission origins of the received reply packets; and
means for transmitting a return instruction for returning the generated one reply packet to the central apparatus to the communication means.

13. A relay unit,
in which a central apparatus and a plurality of terminal devices relay communication made via a plurality of networks, comprising a processor to perform:
transmitting a reception instruction of one request packet having a plurality of destination information consolidated to a communication means;
generating a plurality of request packets on the basis of the consolidated destination information;
transmitting a transmission instruction of the generated request packets to the communication means;
transmitting a reception instruction of reply packets from the terminal devices to the communication means;
generating one reply packet by consolidating the destination information of the transmission origins of the received reply packets; and
transmitting a return instruction for returning the generated one reply packet to the central apparatus to the communication means.

14. A computer memory product storing a computer program,
in which the computer program stored on the computer memory product is executed by a central apparatus, which is connected to a plurality of terminal devices via a relay unit so as to permit data communication via a plurality of networks and monitors continuation and blockade of the network connection with respect to the terminal devices by transmission and reception of a request packet and a reply packet due to a communication monitoring command, wherein
the execution of the computer program causes the computer to perform:
obtaining destination information of the plural terminal devices;
generating one request packet with obtained plural destination information consolidated;
transmitting one generated request packet;
receiving one reply packet, form the terminal devices, which is generated by consolidating the destination information of transmission origins of a plurality of reply packets; and
determining continuation and blockade of the network connection for each terminal device on the basis of the destination information of the consolidated transmission origin.

15. The computer memory product storing a computer program according to claim 14,
wherein the execution of the computer program further causes to computer
to generate the one request packet including the number of times of reception of the reply packet between the terminal device and the relay unit.

16. The computer memory product storing a computer program according to claim 14,
wherein the execution of the computer program further causes the computer
to generate the one request packet including a waiting time from the relay unit transmits the one request packet till the relay unit receives the one reply packet.

17. The computer memory product storing a computer program according to claim 15,
wherein the execution of the computer program further causes the computer
to generate the one request packet including a waiting time from the relay unit transmits the one request packet till the relay unit receives the one reply packet.

18. A computer memory product storing a computer program,
in which the computer program stored on the computer memory product is executed by a relay unit, which permits data communication between a central apparatus and a plurality of terminal devices via a plurality of networks, wherein
the execution of the computer program causes the computer to perform:
receiving one request packet having a plurality of destination information consolidated;
generating a plurality of request packets on the basis of the consolidated destination information;
transmitting the generated request packet;
receiving the reply packets from a plurality of terminal devices;
generating one reply packet by consolidating the destination information of the transmission origins of the received reply packets; and
returning the generated one reply packet to the central apparatus.

* * * * *